(12) United States Patent
Mathai et al.

(10) Patent No.: US 11,016,248 B2
(45) Date of Patent: May 25, 2021

(54) FERRULE COUPLING TO ON-DIE OPTICAL SOCKET

(71) Applicant: Hewlett Packard Enterprise Development LP, Houston, TX (US)

(72) Inventors: Sagi Mathai, Sunnyvale, CA (US); Paul Kessler Rosenberg, Sunnyvale, CA (US); Kevin B. Leigh, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/707,668

(22) Filed: Dec. 9, 2019

(65) Prior Publication Data
US 2020/0110225 A1 Apr. 9, 2020

Related U.S. Application Data

(62) Division of application No. 16/059,015, filed on Aug. 8, 2018, now Pat. No. 10,502,905.

(51) Int. Cl.
*G02B 6/36* (2006.01)
*G02B 6/38* (2006.01)
*G02B 6/293* (2006.01)

(52) U.S. Cl.
CPC ....... *G02B 6/3834* (2013.01); *G02B 6/29395* (2013.01); *G02B 6/3845* (2013.01); *G02B 6/3873* (2013.01)

(58) Field of Classification Search
CPC ...... G02B 6/36; G02B 6/3834; G02B 6/3845; G02B 6/3873; G02B 6/3885; G02B 6/29395
See application file for complete search history.

(56) References Cited

U.S. PATENT DOCUMENTS

| 6,764,224 B2 | 7/2004 | Brun et al. |
| 7,234,874 B2 | 6/2007 | Morse et al. |
| 7,295,743 B2 | 11/2007 | Yatsuda et al. |

(Continued)

FOREIGN PATENT DOCUMENTS

| WO | 2015/176049 A1 | 11/2015 |
| WO | 2017/161061 A1 | 9/2017 |

OTHER PUBLICATIONS

Extended European Search Report received for EP Patent Application No. 19190252.7, dated Dec. 18, 2019, 09 pages.

(Continued)

*Primary Examiner* — Jennifer Doan
(74) *Attorney, Agent, or Firm* — Hewlett Packard Enterprise Patent Department

(57) ABSTRACT

An optical ferrule includes a substrate formed of a diced wafer and a molded structure formed on the substrate. The molded structure may be formed of a curable material. The molded structure may include a plurality of grooves for positioning a plurality of optical fibers therealong, respectively, a plurality of reflective surfaces formed to reflect optical signals from ends of the plurality of optical fibers, respectively, or reflect incident optical signals towards the ends of the plurality of optical fibers, respectively, and an alignment structure disposed to be aligned to a corresponding alignment structure of a socket to which the optical ferrule is coupled.

7 Claims, 14 Drawing Sheets

(56) References Cited

U.S. PATENT DOCUMENTS

| | | | |
|---|---|---|---|
| 7,447,405 B1 | 11/2008 | Yamada et al. | |
| 9,164,249 B2* | 10/2015 | Mathai | H01L 31/02325 |
| 9,746,613 B2 | 8/2017 | Barwicz et al. | |
| 2004/0028349 A1* | 2/2004 | Nagasaka | G02B 6/4292 |
| | | | 385/88 |
| 2009/0092356 A1 | 4/2009 | Yasuda et al. | |
| 2013/0266268 A1 | 10/2013 | Li et al. | |
| 2013/0336619 A1* | 12/2013 | Son | G02B 6/4292 |
| | | | 385/89 |
| 2016/0033724 A1 | 2/2016 | Bylander et al. | |
| 2017/0299824 A1* | 10/2017 | Vallance | G02B 6/4249 |
| 2019/0113697 A1* | 4/2019 | Li | G02B 6/30 |

OTHER PUBLICATIONS

Dannberg et al., "Wafer-Level Hybrid Integration of Complex Micro-Optical Modules", Micromachines, 2014, 5, pp. 325-334.
The Fiber Optic Association, Inc., "Mechanical Splices", Reference Guide to Fiber Optics, Retrieved on Jun. 13, 2018, 8 pages.

* cited by examiner (a)

(b)            (c)

FERRULE COUPLING TO ON-DIE OPTICAL SOCKET

CROSS-REFERENCE TO RELATED APPLICATIONS

This application is a divisional application of and claims priority to application Ser. No. 16/059,015, filed on Aug. 8, 2018, the contents of which is hereby incorporated by reference in its entirety.

BACKGROUND

Tight-tolerance coupling of optical transmission lines between optical connectors, such as optical fibers in optical ferrules and optical waveguides in photonic integrated circuits, is important to reduce coupling loss of optical signals. Especially, single mode coupling loss is highly sensitive to misalignment of optical transmission lines in modularly mating optical connectors. For example, position offset of a small amount (e.g., <2 µm) and tilt offset of a small amount (e.g., <1 deg) can cause significant coupling loss (e.g., >−1 dB). Such misalignment can be caused by mismatch of coefficients of thermal expansion (CTE) among materials used for or around optical transmission lines coupled via modularly mating optical connectors. When a plurality of optical transmission lines are coupled in parallel, the misalignment caused by mismatch of CTE can become larger as every transmission line becomes away from a center of a correspondingly coupled transmission line differently than other coupled transmission lines within an optical ferrule.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
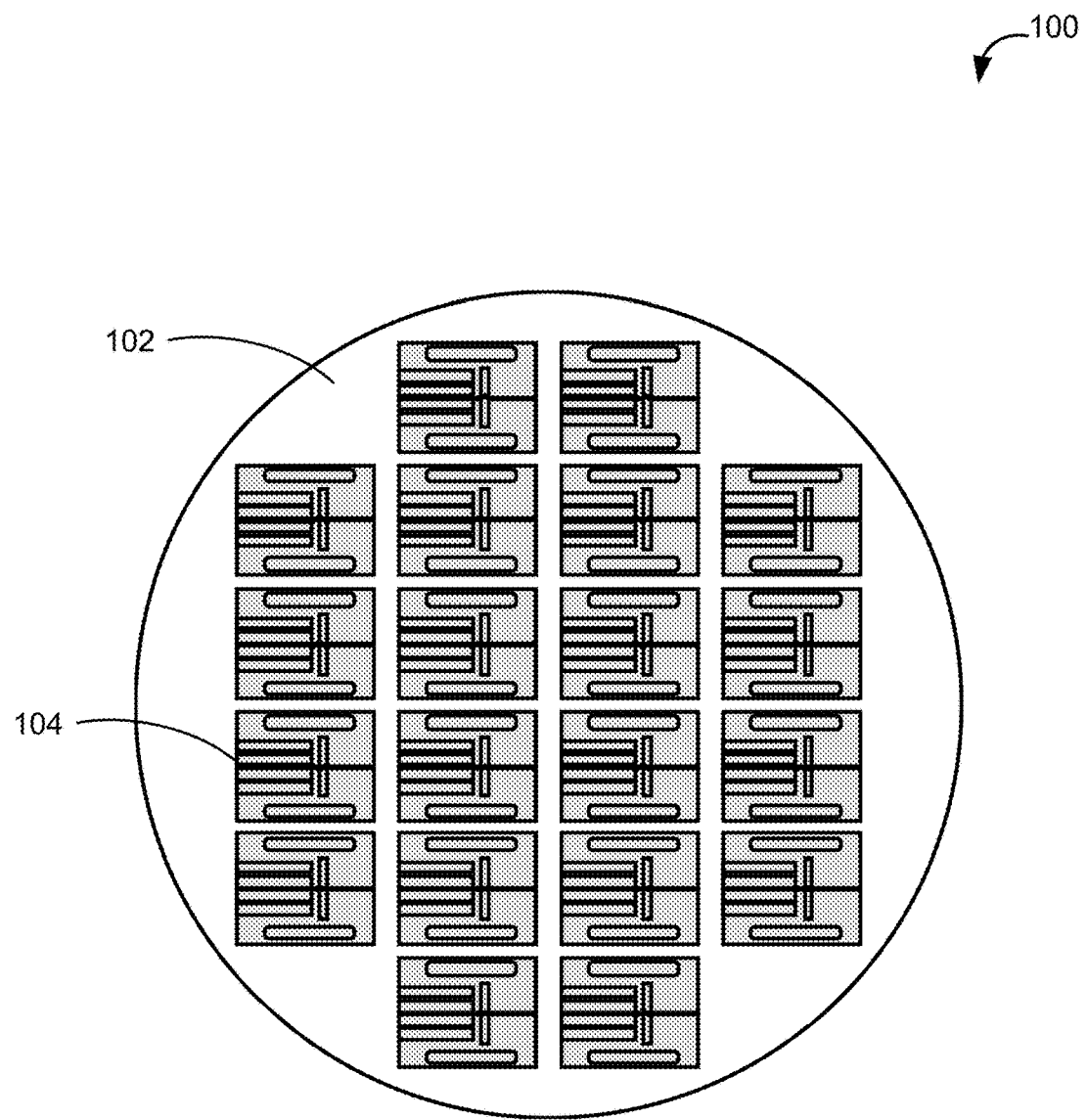
FIG. 1 is a schematic diagram illustrating a plan view of an example of a wafer on which a plurality of molded structures for optical ferrules is formed.

Various embodiments described herein are directed to an optical ferrule and a socket for coupling with the optical ferrule. Conventional optical ferrules and sockets are not sufficient to restrain coupling loss caused by misalignment of single-mode optical transmission lines (e.g. optical fibers). In order to achieve optical coupling with less coupling loss, an optical ferrule of some embodiments of the present disclosure is formed by using optical ferrule structure on a wafer using wafer scale micro-optic manufacturing. Wafer scale micro-optic manufacturing has been employed for micro optical elements, such as micro lenses, diffractive filters, polarizers, and so on.

An optical ferrule according to some embodiments includes a substrate formed of a diced wafer and a molded structure formed on the substrate. The molded structure may be formed of a light curable material. The molded structure may include a plurality of grooves for positioning a plurality of optical fibers therealong, respectively. The molded structure may also include a plurality of reflective surfaces formed to reflect optical signals from ends of the plurality of optical fibers, respectively, or reflect incident optical signals towards the ends of the plurality of optical fibers, respectively. The molded structure may also include an alignment structure disposed to be aligned to a corresponding alignment structure of a socket to which the optical ferrule is coupled.

In some embodiments, the plurality of reflective surfaces are formed to reflect the optical signals from ends of the plurality of optical fibers such that the reflected optical signals pass through the substrate. In some embodiments, the plurality of reflective surfaces are formed to reflect the optical signals from ends of the plurality of optical fibers to a direction away from the substrate. In some embodiments, the molded structure further includes a gap extending along the plurality of grooves and separating the molded structure into a plurality of portions. In some embodiments, the alignment structure of the molded structure includes one or more guide rails extending along the plurality of grooves. In some embodiments, the alignment structure of the molded structure includes one or more guide pillars extending away from the substrate. In some embodiments, the alignment structure of the molded structure includes one or more recesses formed on one or more regions of the molded structure. In some embodiments, the substrate may have a coefficient of thermal expansion (CTE) matched to a CTE of the molded structure.

A socket for coupling with an optical ferrule according to some embodiments includes a base, a socket body, and an alignment structure. The base has embedded optical transmission lines and means for the optical lights to be coupled to the ferrule via light deflectors, e.g., grating couplers. The socket body is formed on the base, and includes a ferrule slot in which the optical ferrule fits. The alignment structure is formed to be aligned to a corresponding alignment structure of the optical ferrule in order for the light paths to be aligned between the optical ferrule and the base. Here, an optical transmission line may include optical ferrules (for ferrule to ferrule coupling), optical waveguides (for ferrule to waveguide coupling) formed on a substrate, optical elements such as lenses, grating couplers, diffraction gratings, etc. (for ferrule to optical element coupling) formed on a substrate.

According to the optical ferrule and the socket of some embodiments, positions of optical fibers can be finely defined at intended positions of the optical ferrule. Also, misalignment between the optical ferrule and the socket can be restraint due to fine alignment therebetween using the alignment structure of the optical ferrule and the corresponding alignment structure of the socket.

FIG. 1 is a schematic diagram 100 illustrating a plan view of an example of a wafer on which a plurality of molded structures for optical ferrules is formed. In the example shown in FIG. 1, a wafer 102 includes a plurality of molded structures 104 for forming a plurality of optical ferrules. The wafer 102 is formed of applicable materials with relatively smaller CTE compared to plastics, such as glass and silicon. The molded structures 104 is formed of applicable resin materials with relatively small CTE.

In some embodiments, in forming the molded structures 104 on the wafer 102, a light-activated (e.g., UV) imprint lithography may be employed. In some embodiments, a light-activated imprint lithography is carried out in accordance with the following procedure: i) manufacturing a step and repeat (S&R) master stamp (mold); ii) manufacturing a working stamp (mold) from the S&R master stamp; iii) forming a layer of a light (e.g., UV) curable resin on a wafer; iv) molding a light curable material formed on a wafer using the working stamp repeatedly for each of the molded structures; v) curing the layer of light curable resin, vi) removing the working stamp from the cured layer of the light curable resin, and vii) dicing the wafer into a plurality of diced chip including a diced wafer and a molded structure formed thereon. According to such light-activated imprint lithography, a fine molded structure for optical ferrules can be manufactured efficiently with lower cost. Further, selecting a suitable light curable material that has a CTE matching with a CTE of the wafer, optical ferrules robust with thermal variation can be formed.

Figure 2:
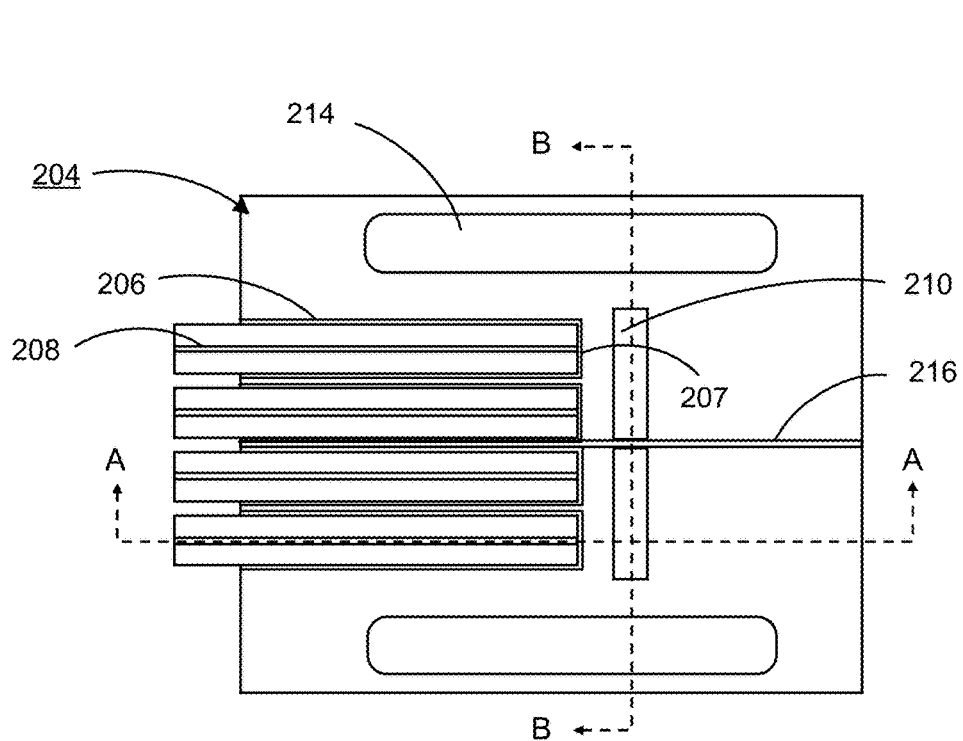
FIG. 2 is a schematic diagram illustrating an example of an optical ferrule according to some embodiments.
Figure 2:
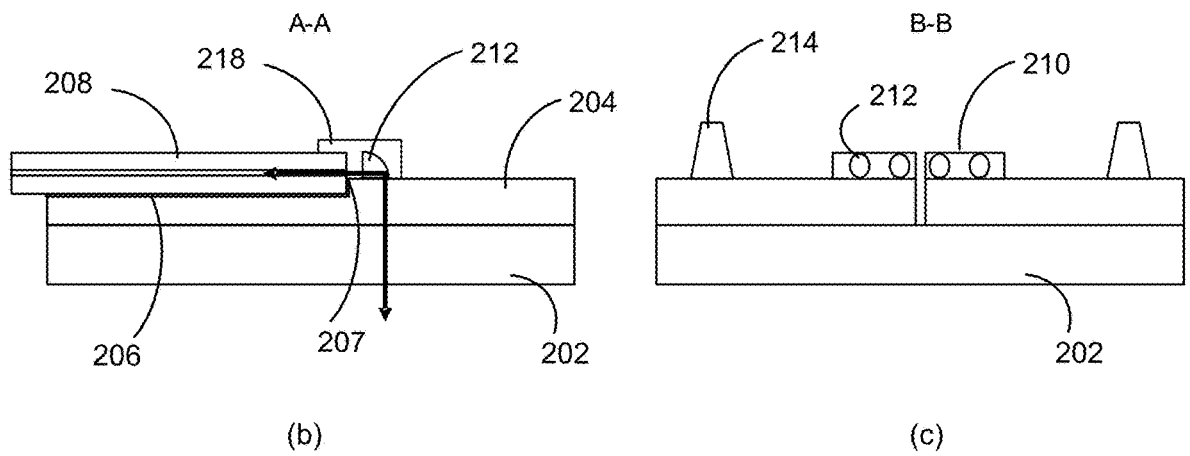

FIG. 2 is a schematic diagram 200 illustrating an example optical ferrule according to some embodiments. In FIG. 2, (a) illustrates a plan view of the optical ferrule, (b) illustrates a cross sectional view of the optical ferrule taken along line A-A, and (c) illustrates a cross-sectional view of the optical ferrule taken along line B-B (omitting optical fiber 208 for clarity). In the example shown in FIG. 2, the optical ferrule is directed for transverse coupling and through-wafer transmission of optical signals. The optical ferrule includes a ferrule substrate 202, a ferrule molded structure 204, a plurality of optical fibers 208 and an index matching filler 218.

In the example optical ferrule shown in FIG. 2, the ferrule substrate 202 is a base structure on which the ferrule molded structure 204 is formed. The ferrule substrate 202 may correspond to a diced wafer, and may be the diced wafer itself or a stacked layer of the diced wafer with one or more other layers, such as an anti-reflection (AR) layer and a prism layer for deflecting optical signals coming into or exiting out from the optical ferrule. In some embodiments, the ferrule substrate 202 may be formed primarily of a glass, silicon, or other suitable material having relatively lower CTE (e.g., 1 ppm to 10 ppm) compared to plastics. Such materials are preferable in that these materials enable flat, rigid, and easily cleanable surface to be aligned with an alignment structure of a socket. In some embodiments, the CTE of the ferrule substrate 202 may be matched to the CTE (e.g., 1 ppm to 50 ppm) of photonic integrated circuit elements (e.g., waveguides, couplers, multiplexers, modulators, switches, amplifiers, converters, laser generators, etc.). The ferrule substrate 202 formed of such materials of low CTE and/or matched CTE may be capable of sufficiently constraining molded optical elements (e.g., the ferrule molded structure 204 or the photonic integrated circuit elements) from expanding. In this paper, CTEs of two materials can be said to be matched, when the difference of the CTEs is less than 6 ppm.

In the example optical ferrule shown in FIG. 2, the ferrule molded structure 204 is a structure for accommodating the optical fibers 208 and aligning with a socket to which the optical ferrule is coupled. In some embodiments, the ferrule molded structure 204 is formed of a light (e.g., UV) curable material matched to the CTE of the ferrule substrate 202. In some embodiments, the ferrule molded structure 204 has a CTE (e.g., 10 ppm to 100 ppm) higher than the CTE of the ferrule substrate 202. A light curable material is preferable in that curing can be performed at low temperature, which can avoid thermal shrinkage during the curing and enable excellent dimensional control. The ferrule molded structure 204 includes a base layer formed on the ferrule substrate 202, and a plurality of grooves 206, a reflector 210, a plurality of reflective surfaces 212 formed on the reflector 210, a plurality of guide rails 214, and a gap 216 formed in or on the base layer. The plurality of grooves 206 is formed on a surface of the base layer of the ferrule substrate 202 and extends from a side edge thereof towards the other side edge opposite to the side edge. Depending on the specific implementation, the cross section of the grooves 206 may have any applicable shapes, such as a triangle, a hemi circle, a rectangle, and so on, so as to precisely define the position of the optical fiber 208. The "groove" may be intended to include both a recess formed in the ferrule molded structure 204 and a guided space formed between two protrusions on the plane surface of the ferrule molded structure 204 and extending substantially in parallel to each other. Hereinafter, a recess formed in the ferrule molded structure 204 is described as a groove for illustrative purposes. Each of the plurality of grooves 206 terminates at an intermediate point between the two side edges and has an end surface 207 at the terminating point. The end surface 207 is formed to be in contact with an end surface of the optical fiber 208 accommodated therein and configured to restrict movement of the optical fiber in the extending direction of the groove 206. The number of grooves 206 is not limited to four, and may be any applicable number (e.g., less than four or greater than four).

The reflector 210 is formed on the base layer of the ferrule molded structure 204 to face the end surfaces of the optical fibers 208 accommodated in the grooves 206, respectively. The plurality of reflective surfaces 212 is configured to reflect optical signals from the end surfaces of the optical fibers 208 accommodated in the grooves 206, respectively. In some embodiments, one or more of the plurality of reflective surfaces 212 includes a parabolic surface configured to converge a flux of light of an optical signal to intensify the optical signal at a designed position on the optical fiber 208. The number of the reflective surfaces 212 may correspond to the number of grooves.

In some embodiments, optical signals from an end surface of an optical fiber 208 is reflected by a reflective surface 212 of the reflector 210 and the reflected optical signals pass through the base layer of the ferrule molded structure 204 and the ferrule substrate 202. The passing optical signals may be received by applicable devices, such as a photo receptor and so on to convert the optical signals to electric signals. In some embodiments, optical signals from the outside of the optical ferrule (e.g., light flux emitted from a light emitting diode or laser) are reflected by reflective surface 212 of the reflector 210 and the reflected optical signals are directed to an end surface of the corresponding optical fiber 208 and transmitted through the optical fiber 208. In a specific implementation, a part of the optical fibers 208 may be used for signal transmission into the optical fibers (in-transmission), and another part of the optical fibers 208 may be used for signal transmission out of the optical fibers (out-transmission). In another specific implementation, a single optical fiber 208 may be used for both the in-transmission and the out-transmission.

The plurality of guide rails 214 are formed on the base layer of the ferrule molded structure 204 along the extending direction of the grooves 206 adjacent to side edges of the base layer of the ferrule molded structure 204. The guide rails 214 serves as an alignment structure to be aligned with corresponding alignment structure of a socket, which is discussed below with reference to FIG. 3. In some embodiments, each of the guide rails 214 includes rounded side edges to be aligned with the corresponding alignment structure of the socket without conflict. In some embodiments, the guide rails 214 may have a tapered cross sectional shape (shown in (c)), such that the guide rails 214 can easily fit with the corresponding alignment structure of the socket. The number of the guide rails 214 is not limited to two, and may be one or greater than two.

The gap 216 is formed in the base layer of the ferrule molded structure 204. The gap 216 is formed to reduce stress caused in the ferrule molded structure 204 as a result of thermal history, which tends to peel off the ferrule molded structure 204 from the ferrule substrate 202. In some embodiments, the gap 216 separates the layer of the ferrule molded structure 204, that is, the gap 216 may extend to the ferrule substrate 202 and a surface of the ferrule substrate 202 may be exposed in the gap 216. In some embodiments, the gap 216 extends in the extending direction of the grooves 206 and separates a part of the grooves 206 and a part of the reflective surfaces 212 from another part of the grooves 206 and another part of the reflective surfaces 212. Depending on a specific implementation, the location of the gap 216 can vary, and is not limited to the center of the ferrule substrate 202.

The index matching filler 218 is an optional layer covering end surfaces of the optical fibers 208 and the reflector 210. The index matching filler 218 is formed to reduce reflection loss at an interface at the end surfaces of the optical fibers 208 and a surface of the reflector 210 facing the end surfaces of the optical fibers 208. The index matching filler 218 is formed of a material having a refractive index matched with that of the optical fibers 208 and/or that of the reflector 210. In a specific implementation, when the index matching filler 218 is employed, a metallic surface may be formed on the reflective surfaces 212. In another specific implementation, when the index matching filler 218 is not employed, an interface between the material of the reflector 210 and its atmosphere may meet a condition of total reflection. Also, an AR coating may be formed on the end surfaces of the optical fibers 208.

Figure 3:
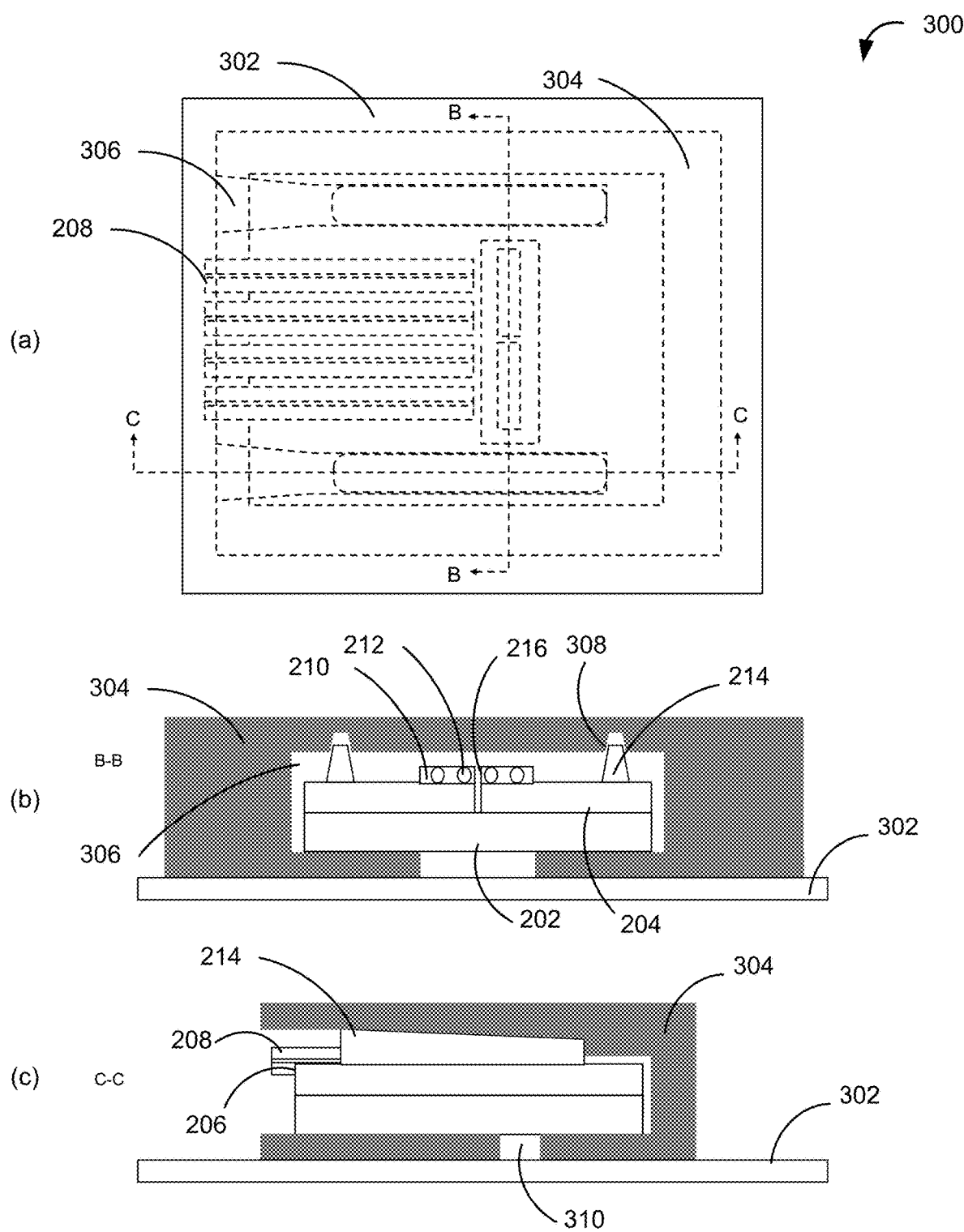
FIG. 3 is a schematic diagram illustrating an example of the optical ferrule shown in FIG. 2 coupled to a socket according to some embodiments.

FIG. 3 is a schematic diagram 300 illustrating an example of the optical ferrule shown in FIG. 2 coupled to a socket according to some embodiments. In FIG. 3, (a) illustrates a perspective plan view of the optical ferrule coupled to the socket, (b) illustrates a cross sectional view of the optical ferrule coupled to the socket taken along line B-B, and (c) illustrates a cross sectional view of the optical ferrule coupled to the socket taken along line C-C. For better illustration of the structures, some of the figures of FIG. 3 and the following figures may include elements with solid fill. In the example shown in FIG. 3, the socket includes a socket base 302 and a socket body 304. The optical ferrule coupled to the example socket, shown in FIG. 3 and the following figures, may be removable from the socket by sliding or moving in a direction opposite to an insertion direction of the optical ferrule.

In the example socket shown in FIG. 3, the socket base 302 is a base structure on which the socket body 304 is attached. The socket base 302 may be formed of an organic substrate or applicable materials with a relatively low CTE, such as glass, silicon, and so on. In some embodiments, a substrate on which various applicable circuit elements are formed for optical signal processing may serve as the socket base 302.

In the example socket shown in FIG. 3, the socket body 304 is a main structure for coupling with the optical ferrule. The socket body 304 may be formed of applicable materials, such as metal, plastic, and resin (e.g., light curable resin). When a light curable resin is employed for the socket body 304, the socket may be manufactured by the light imprint lithography described above. Alternatively, the socket may be manufactured by stamping, machining, injection molding, etc. It may also be assembled from multiple pieces formed by various manufacturing processes. The socket body 304 has a ferrule slot 306, and a plurality of guide slits 308 and a window (light transmission window) 310 formed in the ferrule slot 306. The ferrule slot 306 is a cavity having a side opening and in which the optical ferrule can be inserted from the side opening. The insertion direction of the optical ferrule may be parallel to the socket base 302 or angled with respect to the socket base 302. The optical ferrule may be part of a larger optical connector. In some embodiments, the socket body 304 may be formed of a light-transmissive material, and may not have the window 310. In some embodiments, the window 310 is filled with a light-transmissive material.

In the example socket shown in FIG. 3, the ferrule slot 306 is defined by a bottom portion, side portions, and a top portion of the socket body 304. The guide slits 308 are formed to be aligned with the guide rails 214 of the optical ferrule. In some embodiments, the guide slits 308 may have a wider width at the side opening of the ferrule slot 306, for easy insertion of the optical ferrule. In some embodiments, the guide slits 308 may have a sharper edge at the end portion thereof, as opposed to the guide rails 214, to allow for a gap between the guide rails 214 and the guide slits 308. When the guide rails 214 have the tapered cross sectional shape, the guide slits 308 may also have the tapered cross sectional shape to match the tapered cross sectional shape of the guide rails 214. The window 310 is formed in the bottom portion of the socket body 304 to allow optical signals to pass therethrough. The window 310 is positioned to align with the reflective surfaces 212 of the optical ferrule. In some embodiments, as shown in (c), the guide rails 214 may have a ramped surface to be aligned with a ramped surface of the top portion of the socket body 304, for easy insertion and fine alignment of the optical ferrule.

Figure 4:
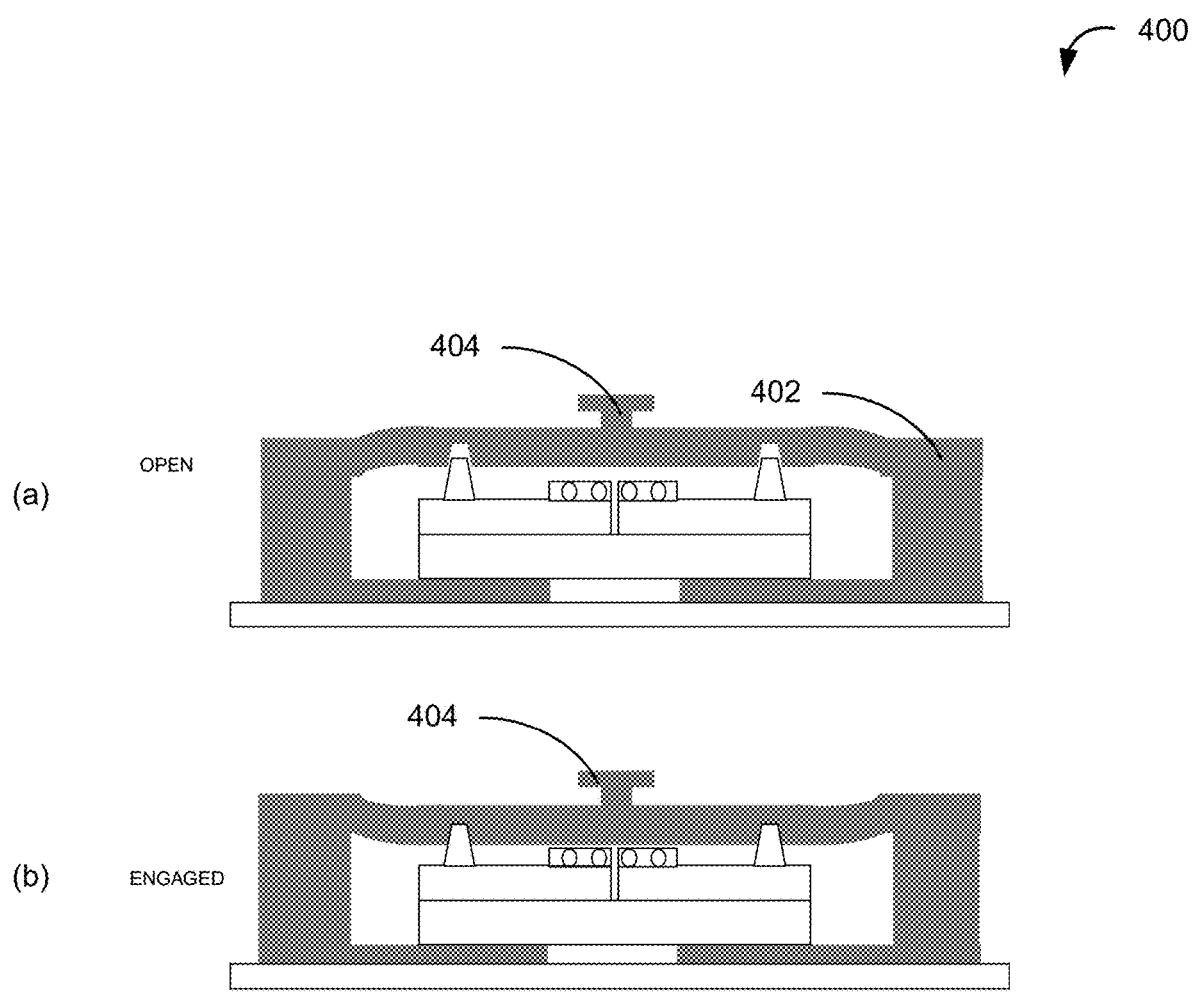
FIG. 4 is a schematic diagram illustrating an example of a process for coupling a socket to an optical ferrule according to some embodiments.

FIG. 4 is a schematic diagram 400 illustrating an example of a process for coupling a socket to an optical ferrule according to some embodiments. In FIG. 4, (a) illustrates a cross sectional view of an open state of the socket in which the optical ferrule inserted, and (b) illustrates a cross sectional view of an engaged state of the socket coupled to the optical ferrule. A socket includes a socket body 402 and a handle 404 formed on the socket body 402. The handle 404 is formed to allow a user to open a ferrule slot of the socket body 402 and insert an optical ferrule while the socket (the ferrule slot) is in an open state. Once the optical ferrule is inserted into the ferrule slot and placed at an alignment position (e.g., a position stopped by the inner wall of the ferrule slot), the handle 404 may be released to cause the ferrule slot return to an original state at which the optical ferrule is engaged with the socket. In some embodiments, a top portion of the socket body 402, or at least part thereof, is formed of an elastic material that enables movement of the top portion up and down. In some embodiments, guide rails of the optical ferrule may not be ramped as in the one shown in FIG. 3.

Figure 5:
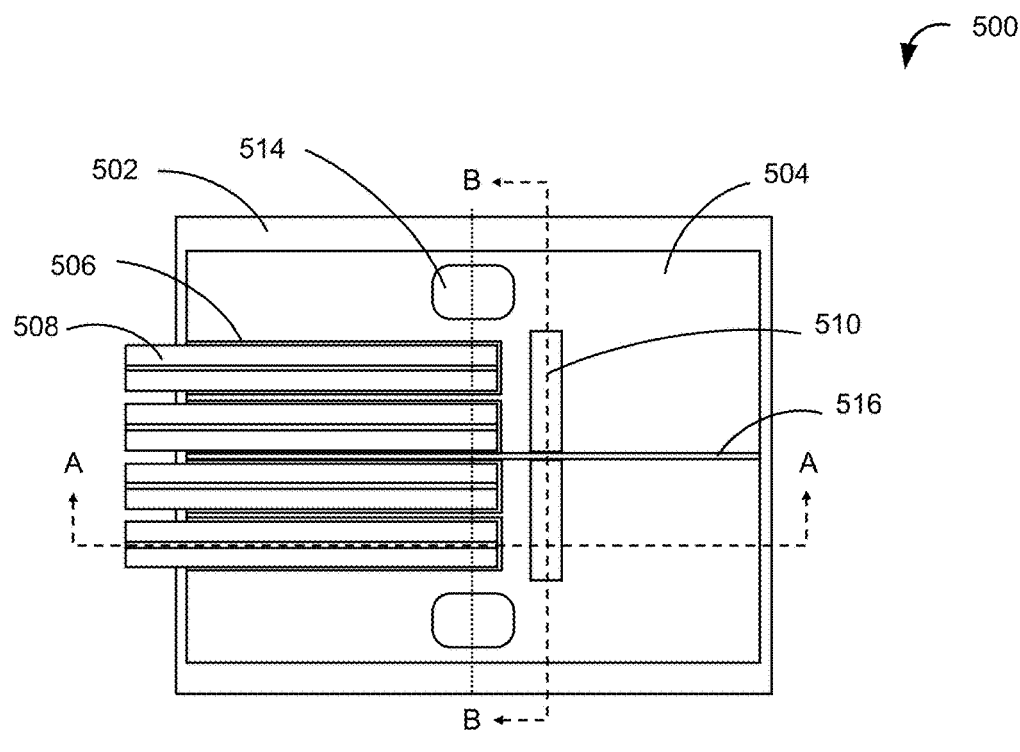
FIG. 5 is a schematic diagram illustrating another example of an optical ferrule according to some embodiments.
Figure 5:
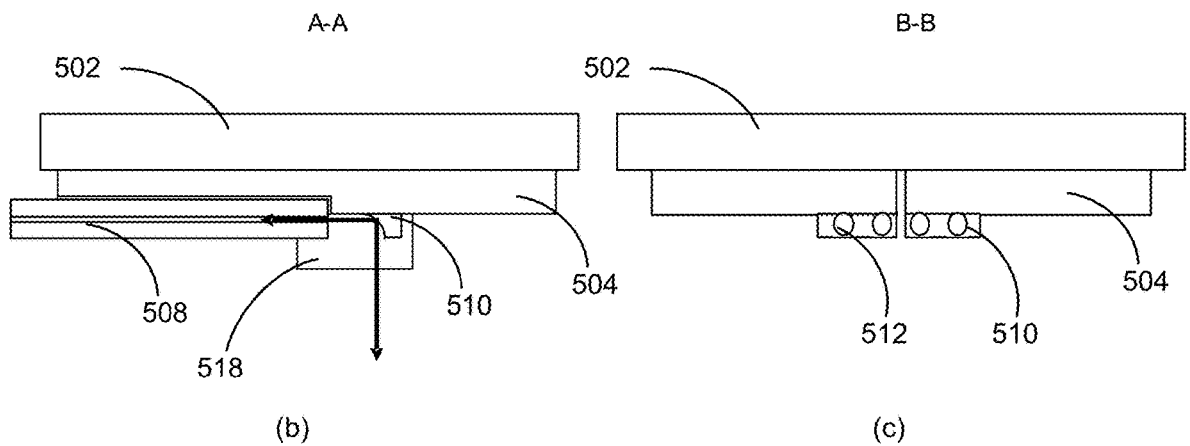

FIG. 5 is a schematic diagram 500 illustrating another example of an optical ferrule according to some embodiments. In FIG. 5, (a) illustrates a plan view of the optical ferrule, (b) illustrates a cross sectional view of the optical ferrule taken along line A-A, and (c) illustrates a cross sectional view of the optical ferrule taken along line B-B. In the example shown in FIG. 5, the optical ferrule is directed for vertical coupling and non-through-wafer transmission of optical signals. The optical ferrule includes a ferrule substrate 502, a ferrule molded structure 504, a plurality of optical fibers 508 and an index matching filler 518. Also, an AR coating may be formed on the light passing surface of the index matching filler 518. The ferrule molded structure 504 includes a plurality of grooves 506, a reflector 510 including a plurality of reflective surfaces 512, a plurality of guide pillars 514, and a gap 516. Most elements of the example optical ferrule depicted in FIG. 5 are substantially the same or similar to the corresponding elements of the example optical ferrule depicted in FIG. 2. Hereinafter, elements different from those of the example optical ferrule depicted in FIG. 2 are primarily described, and description of common features will be omitted.

In the example optical ferrule shown in FIG. 5, the plurality of reflective surfaces 512 of the reflector 510 are formed to reflect optical signals from end surfaces of the optical fibers 508 to a direction apart from the ferrule substrate 502. That is, the optical signals reflected by the reflective surfaces 512 do not pass through the ferrule substrate 502.

In the example optical ferrule shown in FIG. 5, the plurality of guide pillars 514 are formed on a base layer of the ferrule molded structure 504 adjacent to ends of the grooves 506 and extend away from the ferrule substrate 502. The guide pillars 514 are formed to be aligned with corresponding alignment structure of a socket, which is discussed below with reference to FIG. 6. In some embodiments, each of the guide pillars 514 includes rounded side edges to be aligned with the corresponding alignment structure of the socket without conflict. In some embodiments, the guide pillars 514 may have a tapered cross sectional shape (shown in FIG. 6 (b) and (c)), such that the guide pillars 514 can easily fit with the corresponding alignment structure of the socket. The number of the guide pillars 514 is not limited to two, and may be one or greater than two.

Figure 6:
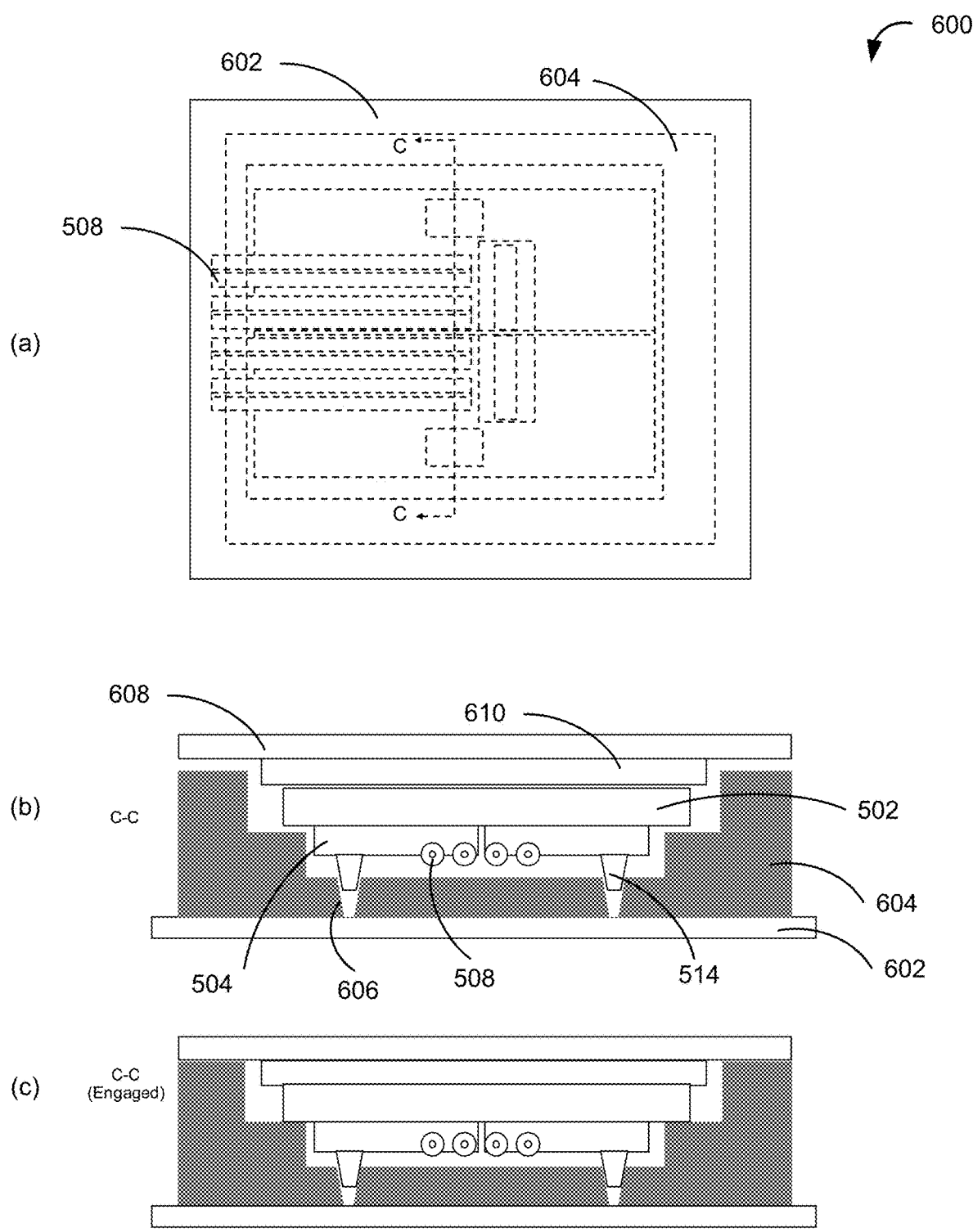
FIG. 6 is a schematic diagram illustrating an example of the optical ferrule shown in FIG. 5 coupled to a socket according to some embodiments.

FIG. 6 is a schematic diagram 600 illustrating an example of the optical ferrule shown in FIG. 5 coupled to a socket according to some embodiments. In FIG. 6, (a) illustrates a perspective plan view of the optical ferrule coupled to the socket, (b) illustrates a cross sectional view of a non-engaged state of the optical ferrule placed on the socket taken along line C-C, and (c) illustrates a cross sectional view of an engaged state of the optical ferrule coupled to the socket taken along line C-C. In the example shown in FIG. 6, the socket includes a socket base 602, a socket body 604, a plurality of guide holes 606, a socket lid 608, and an elastic layer 610. Most elements of the example socket depicted in FIG. 6 are substantially the same or similar to the corresponding elements of the example socket depicted in FIG. 3. Hereinafter, elements different from those of the example socket depicted in FIG. 3 are primarily described, and description of common features will be omitted.

In the example socket shown in FIG. 6, the ferrule slot of the socket body 604 is a cavity having a top opening and in which the optical ferrule can be placed from the top opening. The ferrule slot of the socket body 604 is defined by a bottom portion and side portions. The guide holes 606 are formed to be aligned with the guide pillars 514 of the optical ferrule. In some embodiments, the guide holes 606 may have a tapered edge for easy placement of the optical ferrule in the ferrule slot and have a depth deeper than a length of the guide pillars 514. In some embodiments, the socket body 604 has a surface to be aligned with a bottom surface of the ferrule substrate 502 for fine alignment. In some embodiments, each of the bottom part of the socket body 604 and the socket base 602 has a window (not shown in FIG. 6) to allow optical signals to pass through.

In the example socket shown in FIG. 6, the socket lid 608 is an element to close the ferrule slot of the socket body 604 after the optical ferrule placed into the ferrule slot. In some embodiment, the socket lid 608 has a surface formed to be aligned with a surface (e.g., top surface) of the socket body 604.

In the example socket shown in FIG. 6, the elastic layer 610 is an element to apply a down force to the optical ferrule placed in the ferrule slot, for stability of the optical ferrule, after the socket lid 608 close the ferrule slot. In some embodiments, the elastic layer 610 may be formed of a rubber material, a spring structure, or combination thereof. The elastic layer 610 may or may not be attached to the bottom surface of the socket lid 608.

Figure 7:
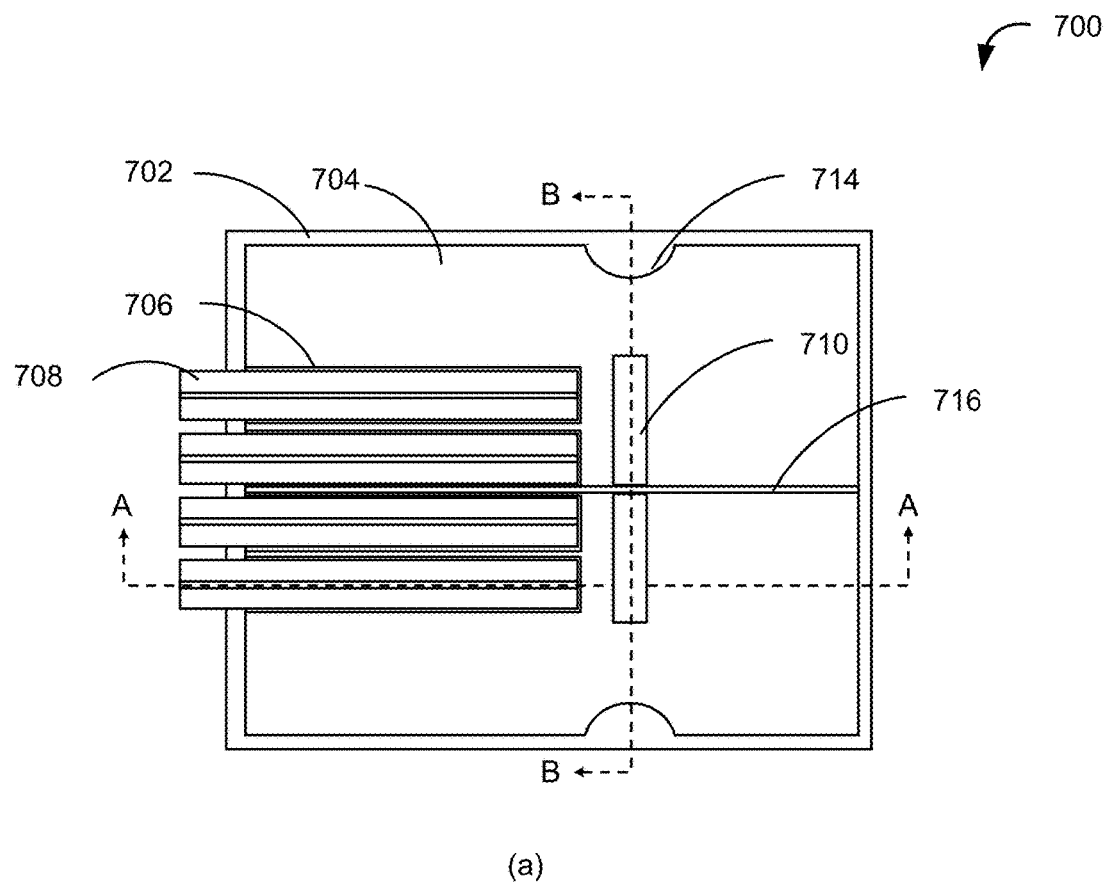
FIG. 7 is a schematic diagram illustrating still another example of an optical ferrule according to some embodiments.
Figure 7:
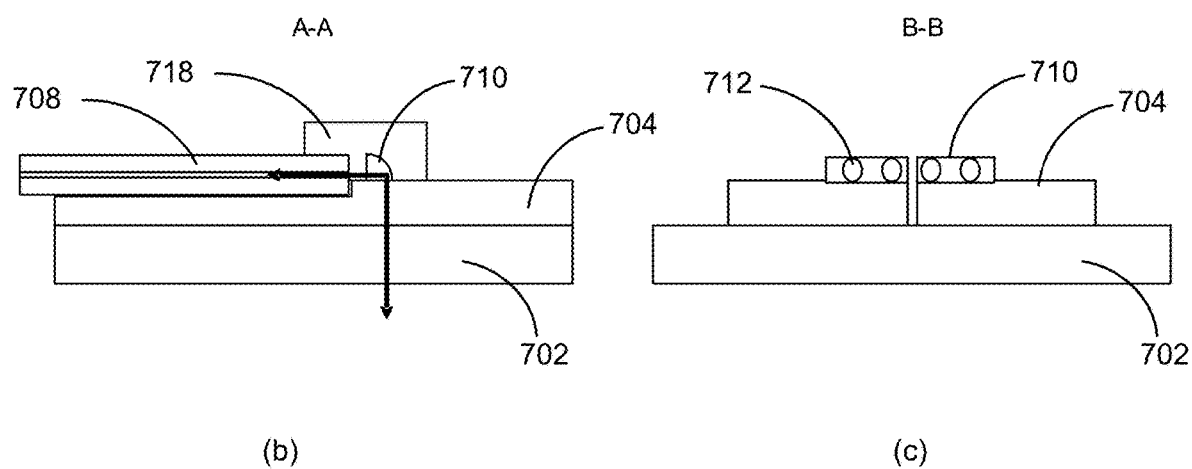

FIG. 7 is a schematic diagram 700 illustrating still another example of an optical ferrule according to some embodiments. In FIG. 7, (a) illustrates a plan view of the optical ferrule, (b) illustrates a cross sectional view of the optical ferrule taken along line A-A, and (c) illustrates a cross sectional view of the optical ferrule taken along line B-B. In the example shown in FIG. 7, the optical ferrule is directed for vertical coupling and through-wafer transmission of optical signals. The optical ferrule includes a ferrule substrate 702, a ferrule molded structure 704, a plurality of optical fibers 708 and an index matching filler 718. The ferrule molded structure 704 includes a plurality of grooves 706, a reflector 710 including a plurality of reflective surfaces 712, a plurality of alignment recesses 714, and a gap 716. Most elements of the example optical ferrule depicted in FIG. 7 are substantially the same or similar to the corresponding elements of the example optical ferrule depicted in FIG. 2 and/or FIG. 5. Hereinafter, elements different from those of the example optical ferrule depicted in FIG. 2 and/or FIG. 5 are primarily described, and description of common features will be omitted.

In the example optical ferrule shown in FIG. 7, the plurality of alignment recesses 714 are formed on side edges of a base layer of the ferrule molded structure 704 in line with the reflector 710. The alignment recesses 714 are formed to be aligned with corresponding alignment structure of a socket, which is discussed below with reference to FIG. 8. In some embodiments, each of the alignment recesses 714 includes a rounded surface to be aligned with the corresponding rounded surface of the socket without conflict. The number of the alignment recesses 714 is not limited to two, and may be one or greater than two.

Figure 8:
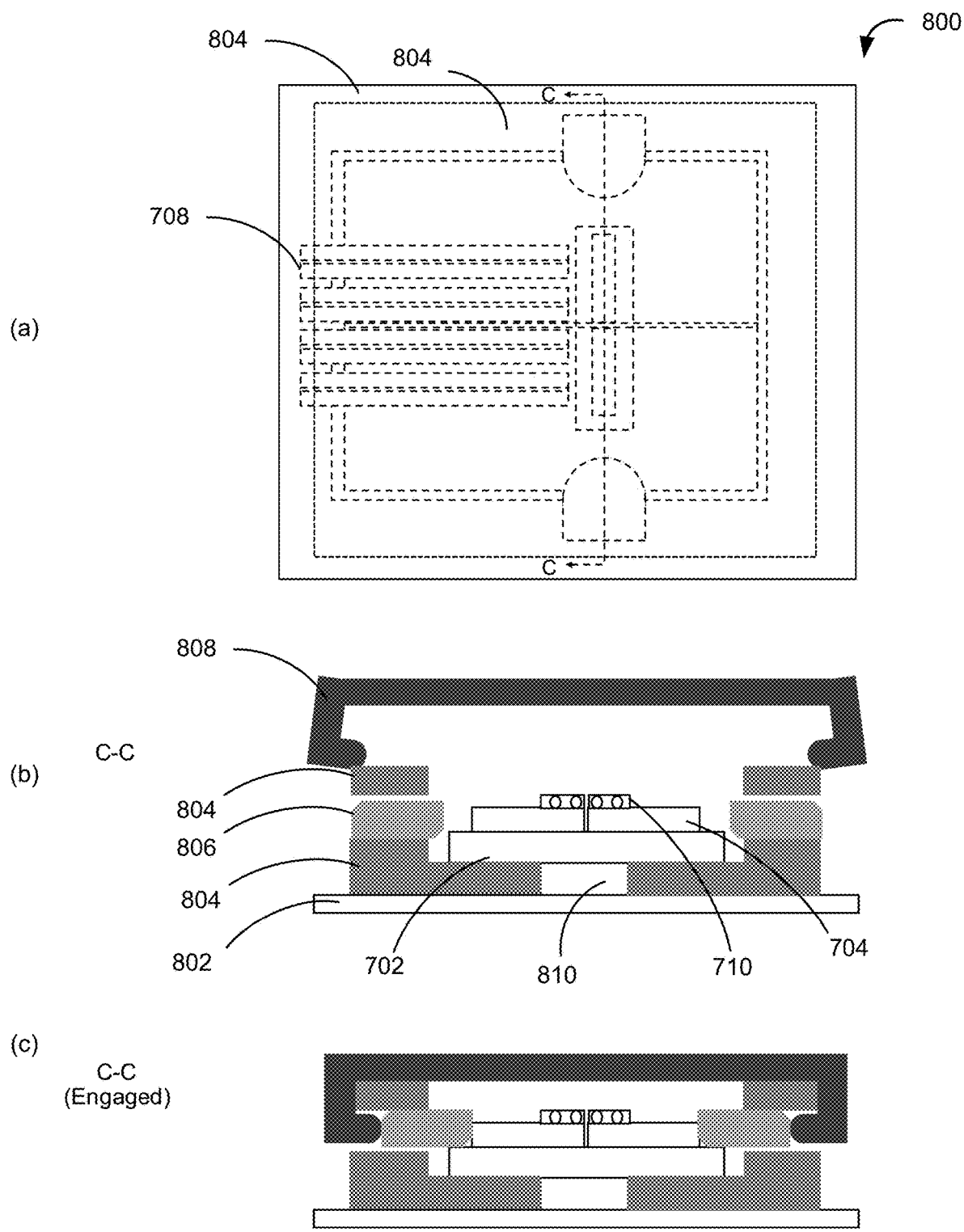
FIG. 8 is a schematic diagram illustrating an example of the optical ferrule shown in FIG. 7 coupled to a socket according to some embodiments.

FIG. 8 is a schematic diagram 800 illustrating an example of the optical ferrule shown in FIG. 7 coupled to a socket according to some embodiments. In FIG. 8, (a) illustrates a perspective plan view of the optical ferrule coupled to the socket, (b) illustrates a cross sectional view of a non-engaged state of the optical ferrule placed on the socket taken along line C-C, and (c) illustrates a cross sectional view of an engaged state of the optical ferrule coupled to the socket taken along line C-C. In the example shown in FIG. 8, the socket includes a socket base 802, a socket body 804, a plurality of engagement sliders 806, a socket cover 808, and a window 810. Most elements of the example socket depicted in FIG. 8 are substantially the same or similar to the corresponding elements of the example socket depicted in FIG. 3 and/or FIG. 6. Hereinafter, elements different from those of the example socket depicted in FIG. 3 and/or FIG. 6 are primarily described, and description of common features will be omitted.

In the example socket shown in FIG. 8, the ferrule slot of the socket body 804 is a cavity having a side opening and in which the optical ferrule can be placed from the side opening. The ferrule slot of the socket body 804 is defined by a bottom portion and side portions. The socket body 804 includes a plurality of side openings in which the engagement sliders 806 can be placed, respectively. In some embodiments, a bottom portion of the socket body 804 has a surface to be aligned with a bottom surface of the ferrule substrate 702 for fine alignment.

In the example socket shown in FIG. 8, the engagement sliders 806 are accommodated in the side openings of the socket body 804 and slidable in transverse directions. In some embodiments, the engagement sliders 806 may be urged to outside direction by an elastic member such as a spring, such that the ferrule slot of the socket body 804 has a sufficient opening to insert the optical ferrule when the engagement sliders 806 are not pushed by end latches of the socket cover 808. At least one of the engagement sliders 806 includes a tapered (or a rounded) edge at an inner bottom side thereof. The engagement slider 806 rides onto a top surface of the ferrule substrate 702 when pushed by the end latch of the socket cover 808 and apply a down force to the ferrule substrate 702 for stability of the optical ferrule. Similarly, at least one of the engagement sliders 806 includes a tapered (or a rounded) edge at an outer top side thereof, which enables smooth sliding of the engagement sliders 806 in the side openings of the socket body 804. The number of the engagement sliders 806 is not limited to two, and may be one or greater than two.

In the example socket shown in FIG. 8, the socket cover 808 is engageable with the socket body 804. The socket cover 808 can shield ambient light from entering into the ferrule slot of the socket body 804, which may cause interference of optical signals. The socket cover 808 includes the side latches configured to push the engagement sliders 806 inward when engaged with the socket body 804. The socket cover 808, at least part thereof, is formed of an elastic material such that the side latches expand when attached to the socket body 804 and return to push the engagement sliders 806.

Figure 9:
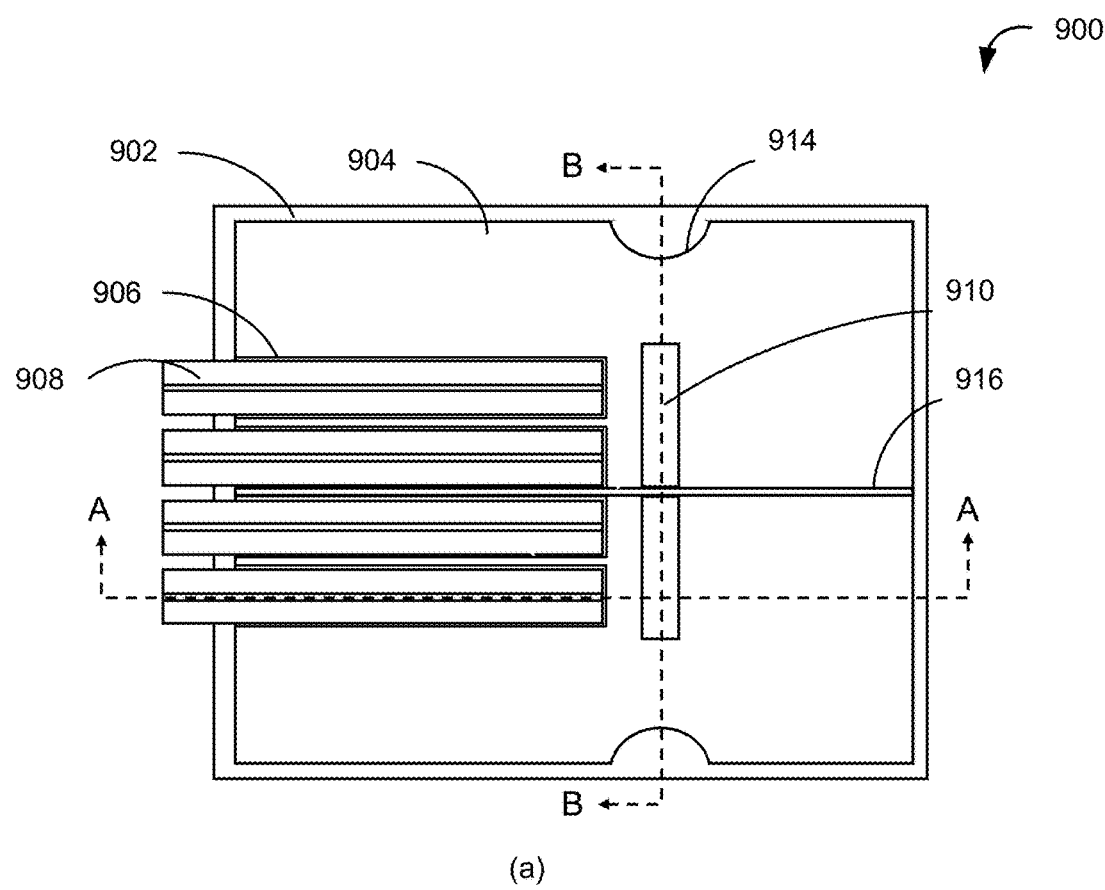
FIG. 9 is a schematic diagram illustrating still another example of an optical ferrule according to some embodiments.
Figure 9:
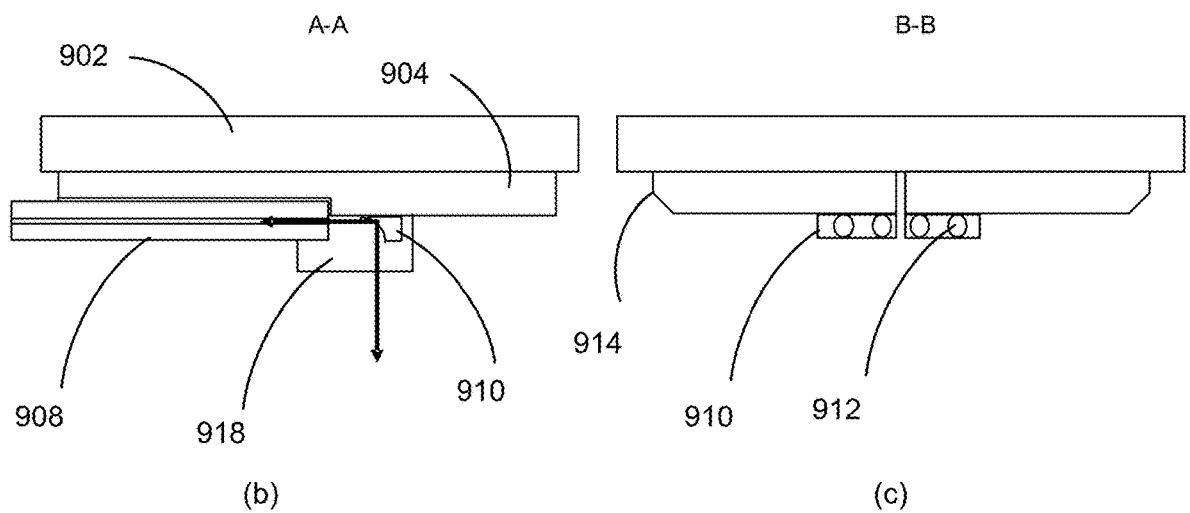

FIG. 9 is a schematic diagram 900 illustrating still another example of an optical ferrule according to some embodiments. In FIG. 9, (a) illustrates a plan view of the optical ferrule, (b) illustrates a cross sectional view of the optical ferrule taken along line A-A, and (c) illustrates a cross sectional view of the optical ferrule taken along line B-B. In the example shown in FIG. 9, the optical ferrule is directed for vertical coupling and non-through-wafer transmission of optical signals. The optical ferrule includes a ferrule substrate 902, a ferrule molded structure 904, a plurality of optical fibers 908 and an index matching filler 918. The ferrule molded structure 904 includes a plurality of grooves 906, a reflector 910 including a plurality of reflective surfaces 912, a plurality of alignment recesses 914, and a gap 916. Most elements of the example optical ferrule depicted in FIG. 9 are substantially the same or similar to the corresponding elements of the example optical ferrule depicted in FIG. 5 and/or FIG. 7. Hereinafter, elements different from those of the example optical ferrule depicted in FIG. 5 and/or FIG. 7 are primarily described, and description of common features will be omitted.

In the example optical ferrule shown in FIG. 9, the plurality of alignment recesses 714 are formed on side edges of a base layer of the ferrule molded structure 904 in line with the reflector 910. The alignment recesses 914 are formed to be aligned with corresponding alignment structure of a socket, which is discussed below with reference to FIG. 10. In some embodiments, one or more of the alignment recesses 914 includes a rounded surface to be aligned with the corresponding rounded surface of the socket without conflict. In some embodiments, one or more of the alignment recesses 914 includes a tapered or rounded edge for easy placement of the optical ferrule on to a ferrule slot of the socket. The number of the alignment recesses 914 is not limited to two, and may be one or greater than two.

Figure 10:
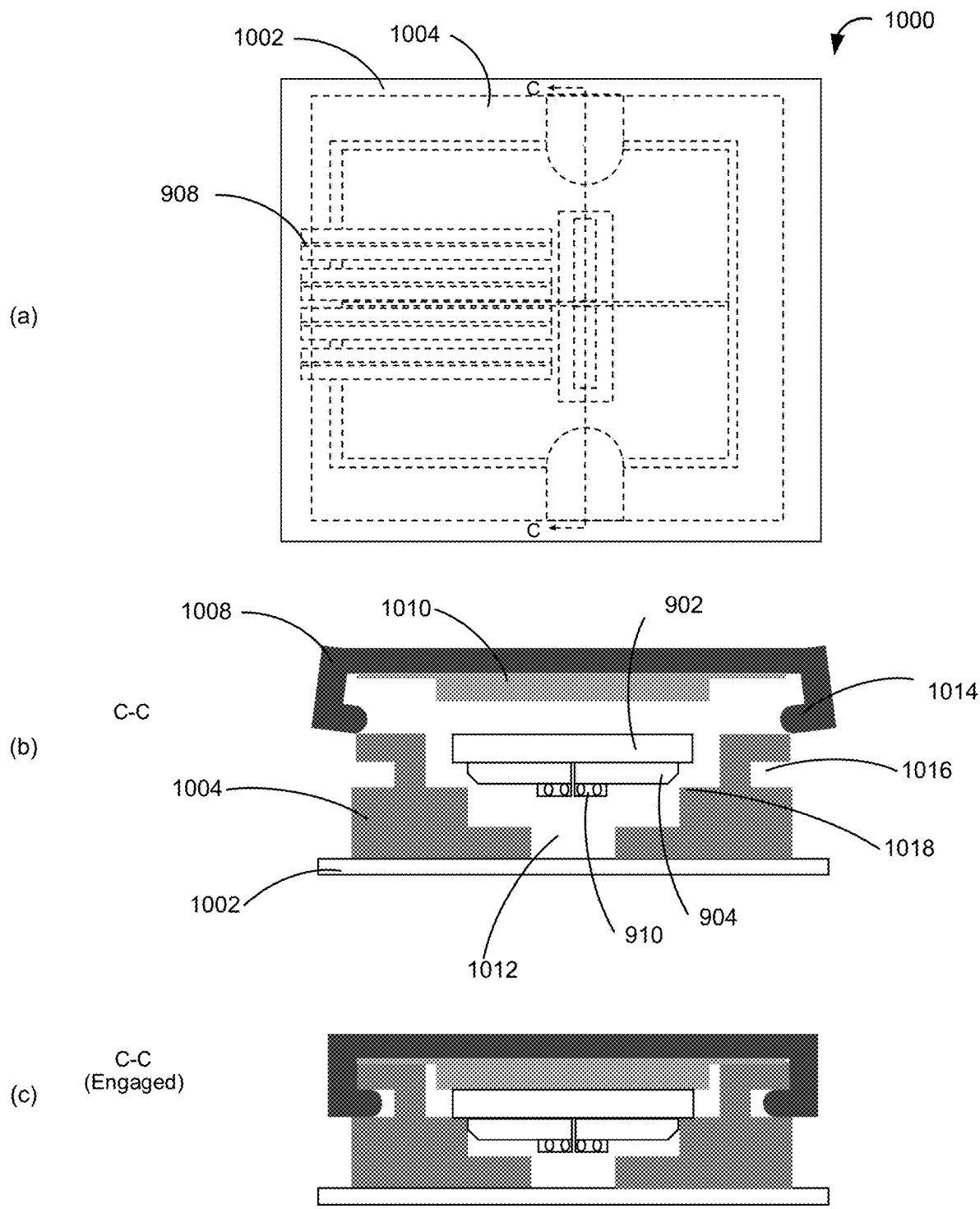
FIG. 10 is a schematic diagram illustrating an example of the optical ferrule shown in FIG. 9 coupled to a socket according to some embodiments.

FIG. 10 is a schematic diagram 1000 illustrating an example of the optical ferrule shown in FIG. 9 coupled to a socket according to some embodiments. In FIG. 10, (a) illustrates a perspective plan view of the optical ferrule coupled to the socket, (b) illustrates a cross sectional view of a non-engaged state of the optical ferrule placed on the socket taken along line C-C, and (c) illustrates a cross sectional view of an engaged state of the optical ferrule coupled to the socket taken along line C-C. In the example shown in FIG. 10, the socket includes a socket base 1002, a socket body 1004, a plurality of engagement sliders 1006, a socket cover 1008, an elastic layer 1010, a window 1012, a plurality of engagement latches 1014, a plurality of latch receptor recesses 1016, and an engagement edge 1018. Most elements of the example socket depicted in FIG. 10 are substantially the same or similar to the corresponding elements of the example socket depicted in FIG. 6 and/or FIG. 8. Hereinafter, elements different from those of the example socket depicted in FIG. 6 and/or FIG. 8 are primarily described, and description of common features will be omitted.

In the example socket shown in FIG. 10, the socket body 1004 includes the latch receptor recesses 1016 to be engaged with the engagement latches 1014 of the socket cover 1008. Different from the end latches of the socket cover 808 in FIG. 8, the engagement latches 1014 may not directly function to align the optical ferrule with the socket, and rather function to be engaged with the socket body 1004. The socket body 1004 also includes the engagement edge 1018 for fine alignment with side surfaces of the alignment recesses 914 and also for fine alignment with a bottom surface of the ferrule substrate 902.

Figure 11:
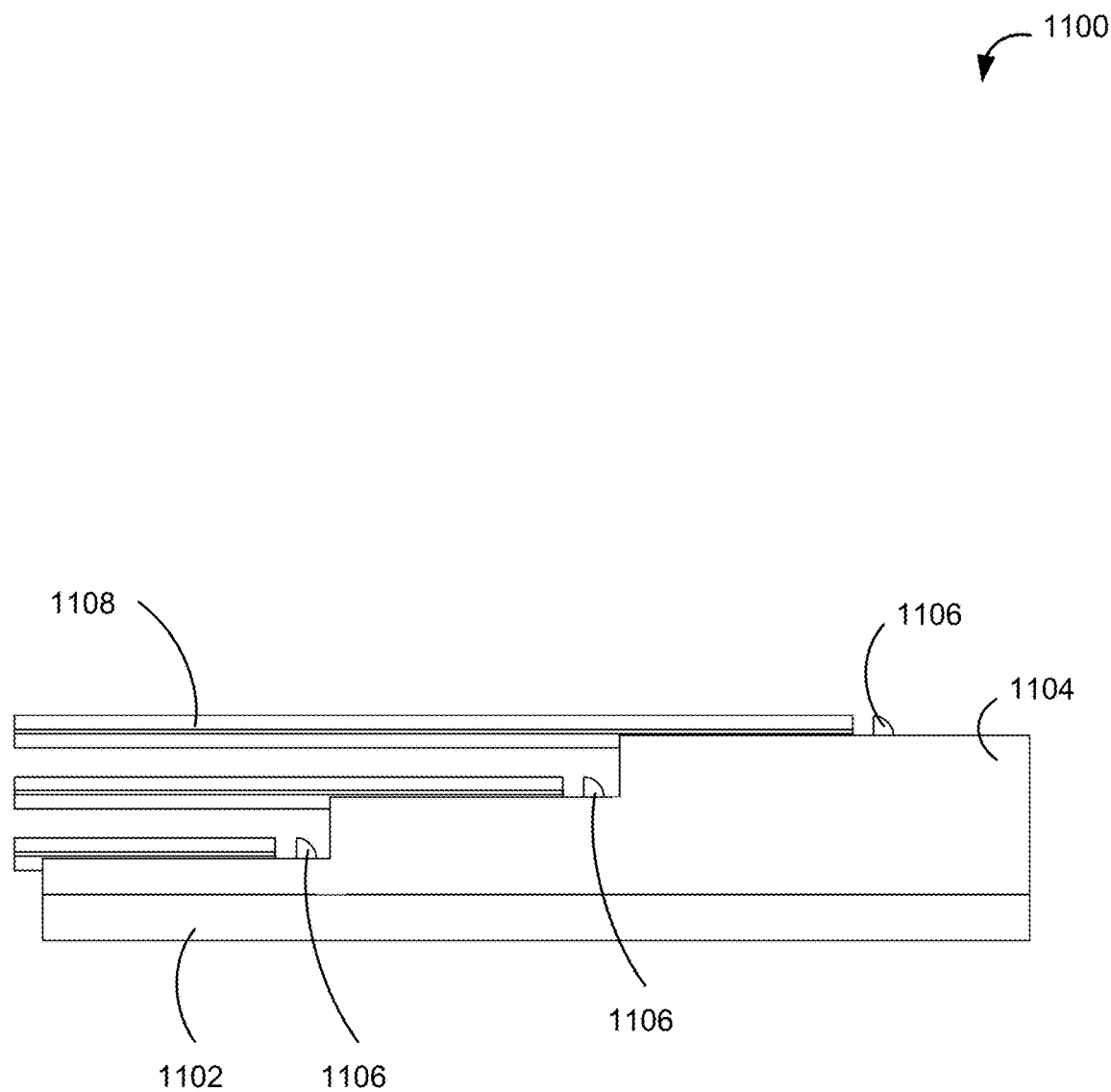
FIG. 11-14 are schematic diagrams illustrating other examples of an optical ferrule according to some embodiments.

FIG. 11-14 are schematic diagrams illustrating other examples of an optical ferrule according to some embodiments. FIG. 11 is a schematic diagram 1100 illustrating a side view of an example of an optical ferrule having a step structure according to some embodiments. The optical ferrule includes a ferrule substrate 1102, a ferrule molded structure 1104, a plurality of reflectors 1106, and a plurality of optical fibers 1108. In the example optical ferrule shown in FIG. 11, the ferrule molded structure 1104 includes a step structure having a plurality of steps, and each of the steps includes one or more grooves for accommodating one or more of the optical fibers 1108. The plurality of reflectors 1106 are disposed on the plurality of steps, respectively, to reflect optical signals from or to the one or more corresponding optical fibers 1108.

Figure 12:
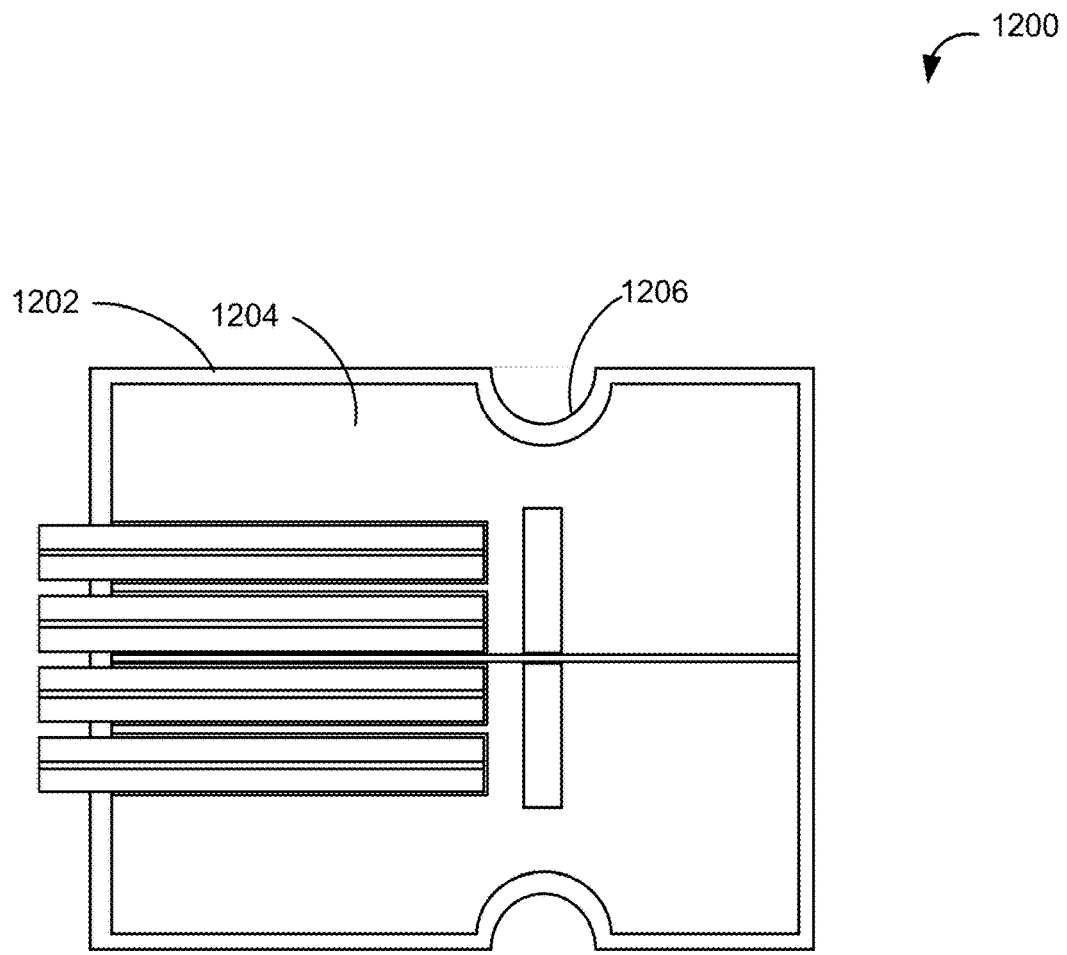

FIG. 12 is a schematic diagram 1200 illustrating a top plan view of an example of an optical ferrule according to some embodiments. The optical ferrule includes a ferrule substrate 1202 and a ferrule molded structure 1204. The ferrule substrate 1202 includes a plurality of alignment recesses 1206 used for alignment of the optical ferrule with a socket. In some embodiments, the alignment recesses 1206 may be used for coarse alignment of an alignment structure of a socket (e.g., the engagement edge 1018 in FIG. 10) before an alignment structure of the ferrule molded structure 1104 is finely aligned with the alignment structure of the socket.

Figure 13:
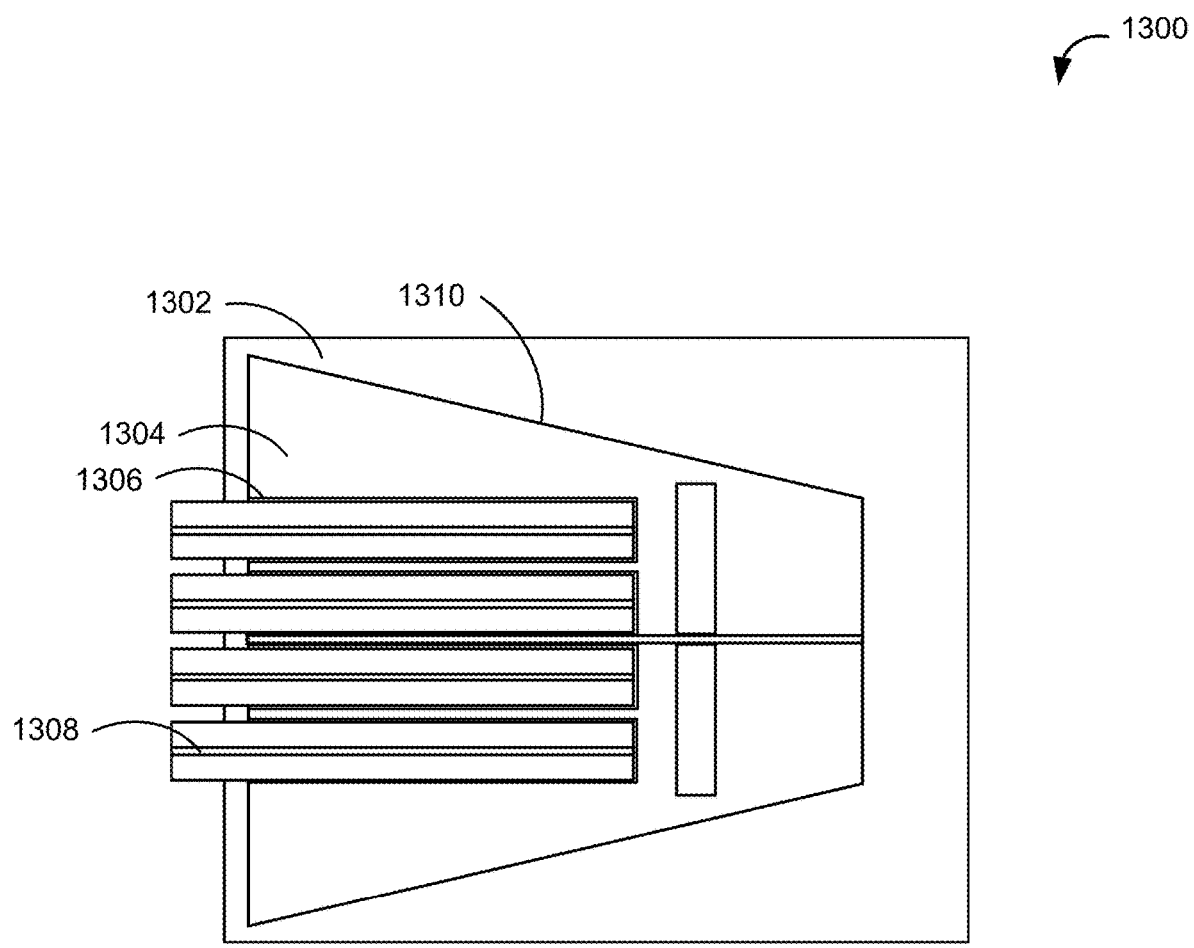

FIG. 13 is a schematic diagram 1300 illustrating a top plan view of an example of an optical ferrule according to some embodiments. The optical ferrule includes a ferrule substrate 1302, a ferrule molded structure 1304 having a plurality of grooves 1306 and side edges 1310 for alignment to a corresponding socket, and a plurality of optical fibers 1308. In the example optical ferrule shown in FIG. 13, a width of the ferrule molded structure 1304 in a direction crossing an extending direction of the grooves 1306 decreases from a side from which the plurality of optical fibers extend out of the optical ferrule to a side opposite to the side, and the alignment structure of the molded structure includes one or more side edges 1310. According to the ferrule molded structure 1304 having the side edges 1310, no separate alignment structure for aligning with the socket may be required.

Figure 14:
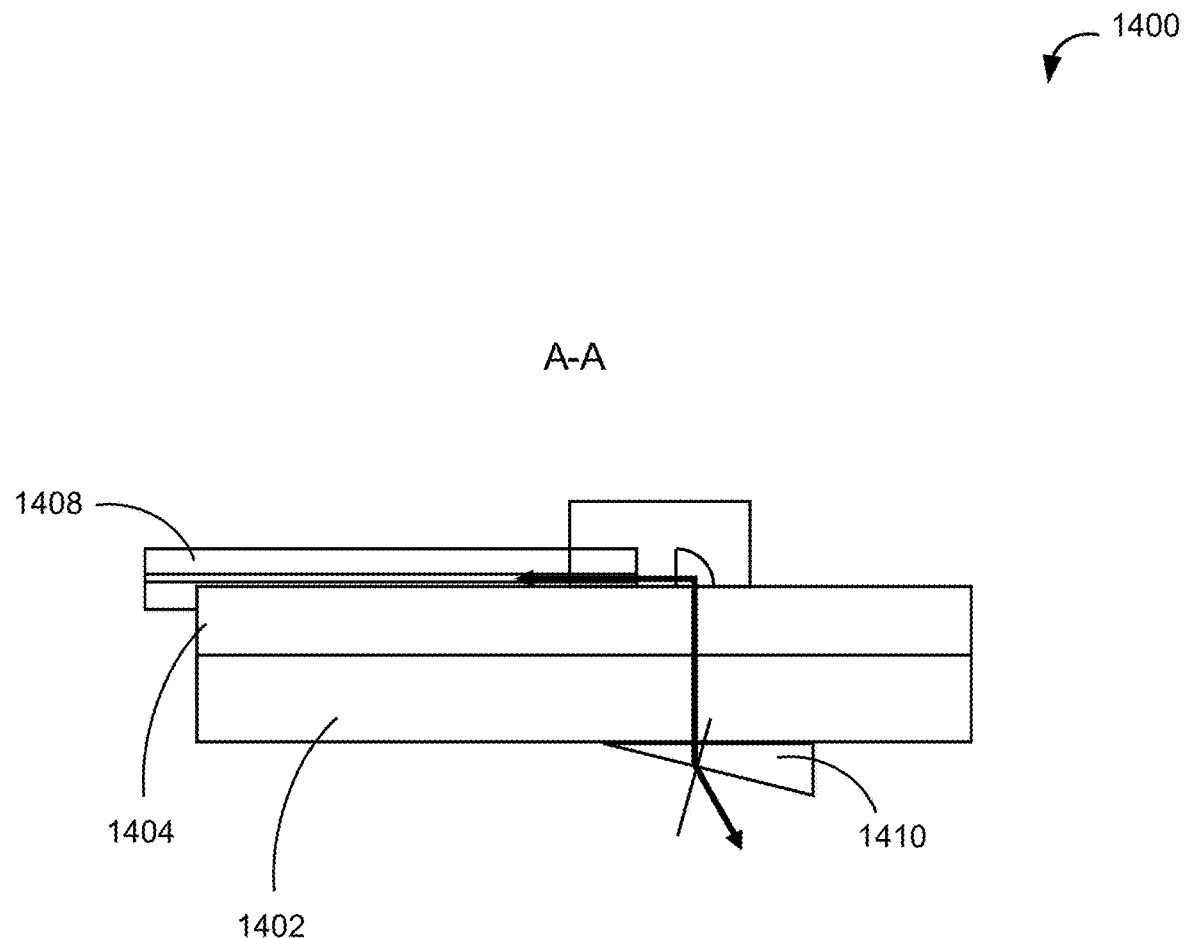

FIG. 14 is a schematic diagram 1400 illustrating a side view of an example of an optical ferrule according to some embodiments. The optical ferrule includes a ferrule substrate 1402, a ferrule molded structure 1404, one or more optical fibers 1408, and a prism 1410. In the example optical ferrule shown in FIG. 14, the prism 1410 is disposed on a surface of the ferrule substrate 1402 opposite to a surface of the ferrule substrate 1402 on which the ferrule molded structure 1404 is formed. The prism 1410 is configured to deflect the optical signals passing through the ferrule substrate 1402. In some embodiments, instead of or in addition to the prism 140, other functional layers may be formed on the surface opposite to the surface on which the ferrule molded structure 1404 is formed.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, the use of particular terminology when describing certain features or aspects of the invention should not be taken to imply that the terminology is being redefined herein to be restricted to including any specific characteristics of the features or aspects of the invention with which that terminology is associated. The scope of the invention should therefore be construed in accordance with the appended claims and any equivalents thereof. For example, an optical ferrule may have guide rails and have reflective surfaces to direct reflected optical signals away from a ferrule substrate (non-through-wafer signal transmission).

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments. Alternatively, one or more embodiments necessarily include logic for deciding, with or without user input or prompting, whether these features, elements and/or steps are included or are to be performed in any particular embodiment.

What is claimed is:

1. An optical connector comprising:
   an optical ferrule comprising a substrate formed of a diced wafer, a molded structure formed on the substrate, and a plurality of optical fibers disposed on the substrate, wherein the molded structure comprises;
      a plurality of grooves for positioning a plurality of optical fibers therealong, respectively; and
      a plurality of reflective surfaces formed to reflect optical signals from ends of the plurality of optical fibers, respectively, or reflect incident optical signals towards the ends of the plurality of optical fibers, respectively;
   a socket for coupling with the optical ferrule, the socket comprising:
      a base;
      a socket body formed on the base, and including an opening configured to receive the optical ferrule; and
      an alignment structure to be aligned to a corresponding alignment structure of the optical ferrule.

2. The optical connector of claim 1, wherein the socket body includes a light transmission window on a bottom part of the socket body facing the base, such that optical signals from the optical ferrule pass through the light transmission window.

3. The optical connectors of claim 1, wherein the opening includes a side opening from which the optical ferrule is inserted, and the alignment structure includes one or more guides along which one or more corresponding guides of the optical ferrule are slid.

4. The optical connector of claim 3, wherein an upper part of the socket body defines an upper wall of the ferrule slot, and a handle is formed on the upper part of the socket body, such that the upper part of the socket body is pulled up and the optical ferrule is inserted into the ferrule slot while the upper part of the socket body is being pulled up.

5. The optical connector of claim 1, wherein the ferrule slot includes a top opening from which the optical ferrule is inserted, and the alignment structure includes one or more holes that are formed on a bottom part of the socket body facing the base and in which one or more alignment pillars of the optical ferrule are fit.

6. The optical connector of claim 1, wherein the ferrule slot includes a top opening from which the optical ferrule is inserted, and the alignment structure includes one or more engagement mechanisms to be engaged with one or more side edges of the molded structure of the optical ferrule, the one or more engagement mechanisms being movable along a surface of the base and engaged with the one or more side edges of the molded structure of the optical ferrule by being moved by a cover of the socket.

7. The optical connector of claim 1, wherein the ferrule slot includes a top opening from which the optical ferrule is inserted, and the alignment structure includes one or more engagement mechanisms to be engaged with one or more side edges of the molded structure of the optical ferrule, the one or more engagement mechanisms being integrally formed with the socket body.

* * * * *